Aug. 23, 1927.
H. D. CHURCH
1,639,881
MOTOR VEHICLE
Original Filed Oct. 12, 1917   2 Sheets-Sheet 1
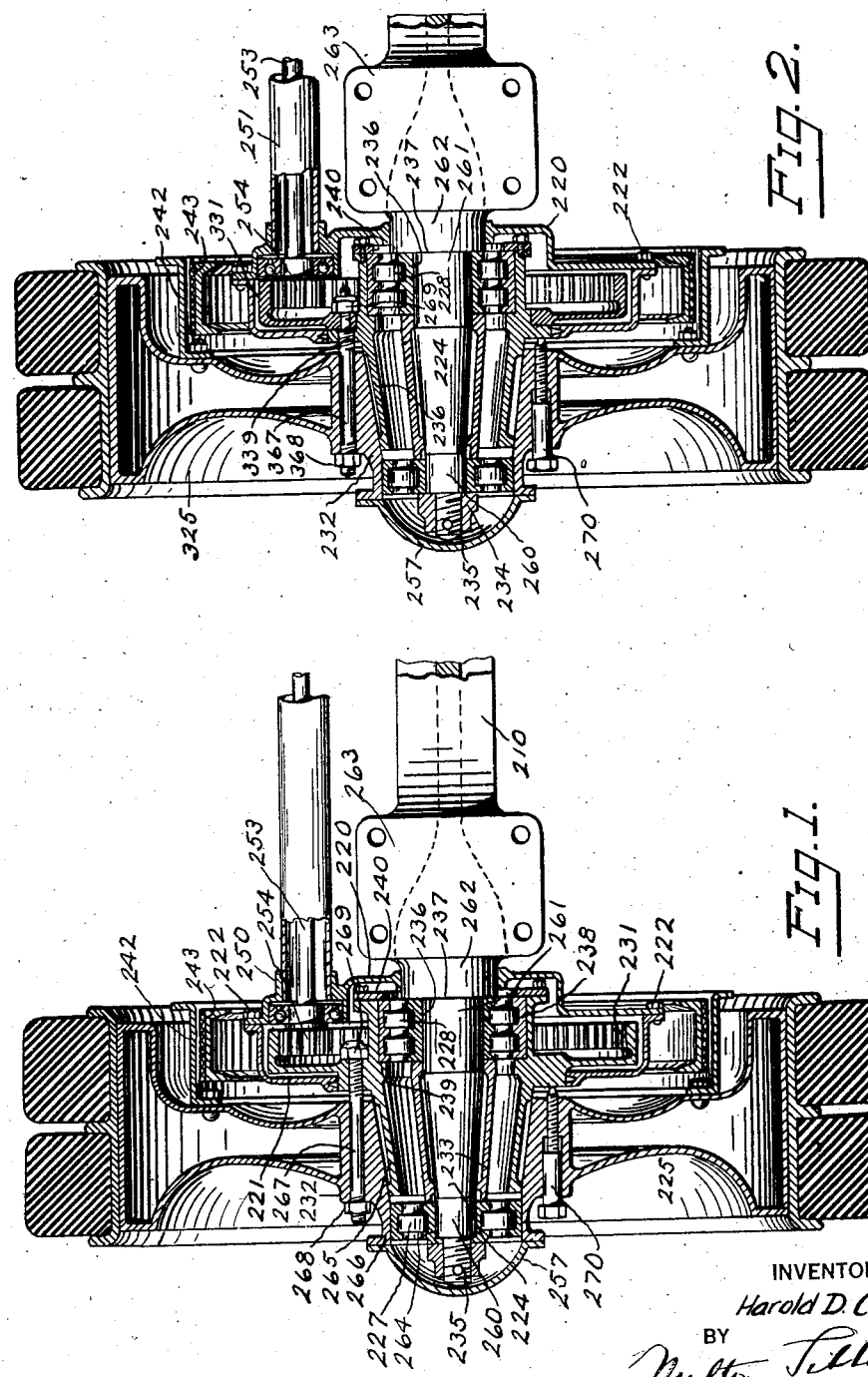
INVENTOR
Harold D. Church.
BY
ATTORNEY Aug. 23, 1927.   H. D. CHURCH   1,639,881
MOTOR VEHICLE
Original Filed Oct. 12, 1917   2 Sheets-Sheet 2
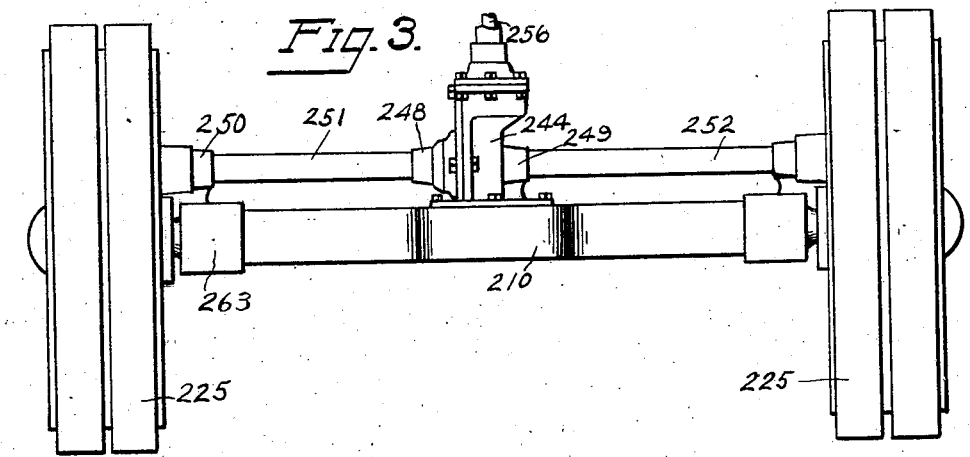
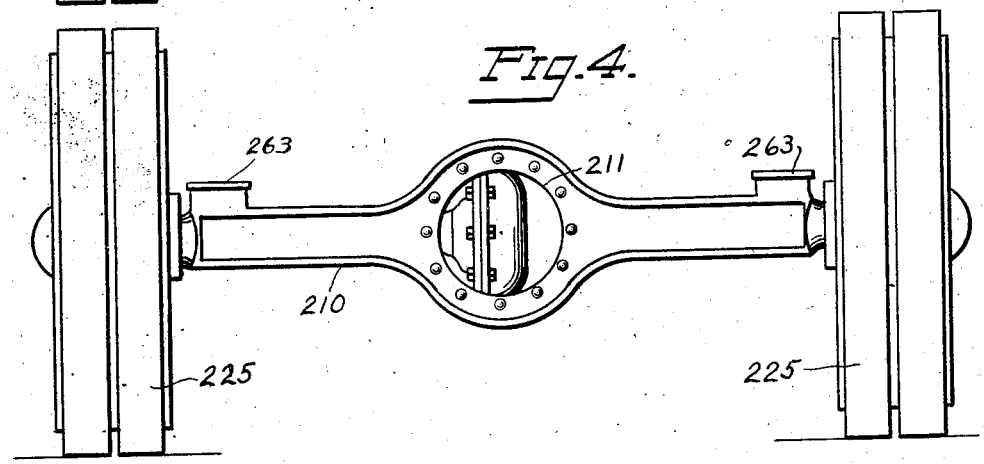
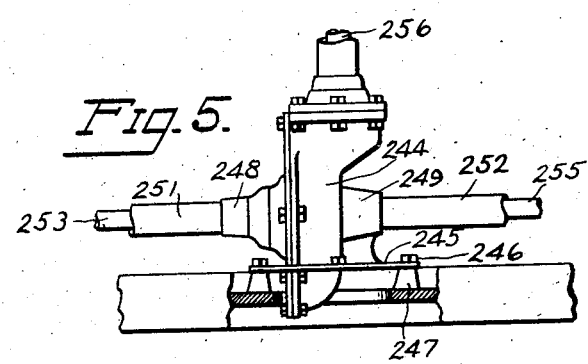
INVENTOR
*Harold D. Church*
BY
ATTORNEY Patented Aug. 23, 1927.

1,639,881

UNITED STATES PATENT OFFICE.

HAROLD D. CHURCH, OF FAIRFIELD, CONNECTICUT, ASSIGNOR TO PACKARD MOTOR CAR COMPANY, OF DETROIT, MICHIGAN, A CORPORATION OF MICHIGAN.

MOTOR VEHICLE.

Original application filed October 12, 1917, Serial No. 196,183. Divided and this application filed September 28, 1922. Serial No. 591,200.

The present invention relates to motor vehicles, and more particularly to an axle construction therefor.

In motor trucks, a strong axle giving maximum road clearance is required. To obtain sufficient road clearance, however, is difficult because of the large gear ratio required in the differential. Furthermore, when a large gear reduction is made in the differential, the shaft sections which transmit the torque from the differential to the wheels must be of large diameter in order to be strong enough to carry the torque. It has been proposed to overcome the above difficulties by locating part of the reduction gearing at the wheels. In the latter construction, there is a reduction at the differential and another reduction at the wheels, and as the driving means connecting the differential and wheel gearings is outside the load carrying member of the axle, a strong axle for a given weight is obtained. Moreover, as part of the reduction is at the wheels the means connecting the differential and wheel gearings rotates at a high speed with proportionately less torque and therefore can be of a relatively light construction. Again, as the reduction in the differential is small, the differential itself is small, thereby giving greater road clearance. If this type of design is carried to its logical conclusion, obviously the reduction at the wheels will be as great as possible in order to permit the use of a small differential. But the reduction at the wheels is limited by the requirements of design, so that, for trucks which must have a high reduction in the drive from the engine to the rear wheels, it is found that the differential is large even when the maximum reduction at the wheels is utilized.

One of the principal features of this invention consists in the provision of a strong axle construction which has means for supporting the differential gearing so that the necessary road clearance is obtained with a large differential. In addition to the limitation of the reduction at the wheels, the size of the reduction in the differential is also limited. The reduction in the differential is limited by the distance that the shaft sections connecting the differential and wheel gearings can be located radially from the center of the wheel. In an axle according to this invention, however, this limitation is removed and a differential reduction practically of any desired value may be used.

A further feature of the invention resides in the construction for mounting the wheels on the axle so that they are secured to the same for removal independently of the wheel gearing. That is to say, the wheels may be removed without in any way disturbing the wheel driving gears.

A further feature resides in the novel construction of the axle load carrying member.

Another feature consists in the provision of two widely spaced bearings for rotatively supporting each wheel on the axle load carrying member. In the type of drive involved in this invention, a gear is secured to the wheel, and if the wheel has any tilting movement about an axis perpendicular to the wheel axis, the gear has a corresponding tilting motion, which causes excessive wear and, of course, increased friction in the wheel gearing. Obviously, if the wheel bearings are close together, the looseness in the bearings permits a greater tilting of the wheel than in the case where the bearings are widely spaced.

Another feature consists in the combination and arrangement of parts whereby the wheel gearing may be located in a casing within the wheel brake drum and yet permit a large reduction ratio between the engine and wheels.

Other objects and features of novelty will be apparent from the description taken in connection with the drawings, in which:

Fig. 1 is a sectional plan view of a portion of a motor vehicle showing one embodiment of the present invention;

Fig. 2 is a sectional view, similar to Fig. 1, illustrating another form of the invention;

Fig. 3 is a plan view of the axle and wheels of the forms of the invention shown in Figs. 1 and 2;

Fig. 4 is a rear elevation of Fig. 3; and

Fig. 5 is a plan view, partially in section, illustrating the construction for securing the differential casing to the load carrying member of the forms shown in Figs. 1 and 2.

Referring now to the form of the invention shown by Figs. 1, 3, 4 and 5, it will be seen that the load carrying member 210 of the axle construction is a solid member which extends from wheel to wheel and carries the wheels on the ends thereof. As shown in the drawings, this member is of I-beam cross section and has its greatest depth at the central part of its length. The web of this central part is formed with an aperture 211 so that the said central part in effect may be considered as a ring. The ends of the member 210 are each formed with a reduced threaded portion 235, the cylindrical portion 260, conical portion 224 connected to the cylindrical portion 260 and then the enlarged cylindrical portion 261 having a shouldered portion 262, which is adjacent the pad 263 to which a spring may be secured. An end plate 220 is mounted on the shouldered portion 262 of the load carrying member and this plate is secured to the member against rotation in any desired manner as by being shrunk thereon. A casing member 221 is secured to the plate 220, as by means of bolts 222, so that the plate 220 and member 221 form an oil tight casing or housing for the wheel driving gears. A roller bearing 227 is mounted on the cylindrical portion 260 and another roller bearing 228 on the cylindrical portion 261 of the load carrying member. Interposed between the inner race ring of the bearing 227 and the inner race ring of the bearing 228 is a conical sleeve 233. The arrangement of the parts is such that the nut 234 screwed on the threaded end 235 of the axle member thrusts the race ring 264 of bearing 227 against the sleeve 233 which in turn thrusts the race ring 236 against the shoulder 237 formed upon the shouldered portion 262. An internal gear 231 is arranged within the gear casing and is formed with a projecting hub which is mounted on the outer race ring 238 of the bearing 228. For the purpose of preventing longitudinal movement of the gear with respect to the bearing, the hub is provided with the internal lip 239 which abuts one end of the outer race ring and the removable ring 240 which abuts the other end of said race ring. Projecting from the opposite side of said gear, with respect to the portion just described, is a conical sleeve 265 which carries a wheel 225 of the vehicle. For this purpose the wheel is provided with a hub 232 which is formed with a bore having a conical portion adapted to take over the conical sleeve 265 with a circular portion 266 adapted to receive the outer race ring of the bearing 227. In order to secure the wheel to the gear 231 for rotation therewith, the gear is provided with a circular series of bolts 267, which are threaded in a portion of the gear just outside its hub and extend through the hub 232 of the wheel. The opposite ends of the bolts 267 have the nuts 268 and 269 screwed thereon for securing the wheel and gear against relative longitudinal movement. It will be seen that the above described arrangement of parts associated with the bearing 228 takes up the thrust towards the right, as viewed in Fig. 1, the force of the thrust will be carried to the conical sleeve 265 of the internal gear adjacent to the outer race ring 238 of the bearing 228, through the rollers and inner race ring of the bearing to the shoulder 237 of the axle. In a similar manner if the wheel is thrust towards the left, as viewed in Fig. 1, the force thereof will be transmitted through the bearing 228 to the inner race ring 236, thence through the conical sleeve 233, the inner race ring 264 of the bearing 227 to the nut 234 on the axle.

The vehicle may be provided with the usual brake drum 242 with which the brake band 243 is adapted to co-operate. It will be seen that the arrangement of the parts is such that the gear casing is mounted so that it is radially within the brake drum of the wheel. Consequently, the gear casing is protected to a considerable extent against hitting protruding objects. Furthermore, the above described arrangement of parts permits the bearing 228 to be located substantially in the transverse plane with the internal gear 231. It is desirable to have this bearing as near as possible in the plane of the gear 231 so as to eliminate the moment tending to turn the gear transversely, this moment being due to the thrust of the gears on each other.

As shown in Fig. 5, the differential casing 244 is provided with a circular flange 245, which is secured to the load carrying member of the axle by means of the bolts 246, the flange being spaced from the web of the member as may be required by the lugs or spacing members, 247. It will be seen that by providing the aperture 211 in the web of the axle member 210 and increasing the depth thereof at the central part, the differential casing 244 is permitted to extend through the aperture 211, thus allowing the use of a differential which has a high reduction. Furthermore, although the web of the axle member is cut away at 211, the strength of the member is not decreased as the added depth more than compensates for the web cut away.

The differential casing on opposite sides thereof is formed with the hollow bosses 248 and 249. The end plate 220 of the wheel gear casing is provided with a hollow boss 250, which is aligned with the boss 248 and a tube or sleeve 251 is mounted in these two bosses. A similar tube 252 extends from the boss 249 to the opposite gear casing. For the purpose of rotatively connecting the differential and the wheel 225, the shaft 253 extends from the differential through the tube 251 and into the wheel gear casing, and has on the end thereof within the said casing, a pinion 254 which meshes with the annular gear 231. A similar shaft 255 extends to the other wheel.

It is to be understood that Fig. 4 illustrates the differential casing and portion of the axle which goes with Figs. 1 and 2 and that although only one wheel is illustrated that the parts on the right-hand side of the differential, as viewed in Fig. 4, are the same as the parts on the left-hand side shown by Figs. 1 or 2, and hence illustration thereof is not necessary.

The form of the invention illustrated by Fig. 2 is the same as that shown by Fig. 1 except that the internal gear 331 is not formed integral with the conical sleeve 365, as is shown in Fig. 1. For the purpose of connecting the internal gear 331 and the vehicle wheel 325, the conical sleeve 365 is formed with the radial flange 339, which at one side thereof carries the annular gear 331 and has threaded therethrough the circular series of bolts 367. Each of these bolts extends through the hub 232 of the wheel, and has a nut 368 on the corresponding end thereof. The other end of each bolt extends through the annular gear 331, and a nut 269 secures the said gear against the flange 339.

In the operation of the parts shown by Figs. 1, 2 and 4, the shaft 256 driven by the vehicle motor through the differential rotates the shafts 253 and 255, thereby through the wheel gearings driving the wheels. It will be observed that Figs. 1 and 2 illustrate a gear reduction at the wheels which is of as large a value as can be obtained with the gearing arranged within the brake drum. Furthermore, because of the method of attaching the differential casing to the load carrying member of the axle, a differential having a high gear reduction may be used as the size of the casing is not limited by the distance between the axis of the shaft 253 and the load carrying member of the axle. The aperture 211 in the load carrying member permits the differential casing to project through the web of the member so that a large casing, and consequently, a large gear reduction in the differential may be used. In addition to the feature just described, the vehicle wheel may be removed from the axle without in any way disturbing the wheel gearing. For this purpose the nuts 268 are removed whereupon the wheel may be withdrawn from the conical sleeve 265 by screwing up the set screw 270 which is carried in the hub of the wheel, and has its inner end in contact with the radial flange on the said conical sleeve. If it is necessary to get at the gearing, then the nut 234 and cap 257 on the end of the axle are unscrewed and the bolts 224 connecting the casing members removed whereupon all the parts carried by the end of the axle except the casing plate 220 may be taken off. In the form of the invention shown by Fig. 1, if a new internal gear is required, of course the attached hub and conical sleeve must also be furnished, whereas in the form shown by Fig. 2, as the gear is detachable from the hub, only the detachable portion need be replaced.

It is understood that although several embodiments of the invention have been described specifically, yet the details thereof may be varied within the scope of the attached claims.

Having thus described my invention, what I claim and desire to secure by Letters Patent is:

1. In a motor vehicle axle construction, the combination of a load carrying member having spindle portions at its ends, a road wheel for each spindle portion comprising inner and outer hubs detachably connected together, and separated bearings between each spindle portion and its wheel, one of said bearings being between the inner hub and said spindle portion and the other said bearing being between the outer hub and said spindle portion.

2. In a motor vehicle axle construction, the combination of a load carrying member having a spindle portion at its end, spaced bearings on the spindle portion, a sleeve mounted on one of said bearings so that end thrusts of said sleeve are taken entirely through said bearing, and a wheel detachably mounted on said sleeve and having a part mounted on the other of said bearings.

In testimony whereof I affix my signature.

HAROLD D. CHURCH.